(12) United States Patent
Ruckart (10) Patent No.: US 7,903,801 B1
(45) Date of Patent: Mar. 8, 2011

(54) CONTACT INFORMATION MANAGEMENT (75) Inventor: John P Ruckart, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1188 days.

(21) Appl. No.: 11/539,571

(22) Filed: Oct. 6, 2006

(51) Int. Cl.
*H04M 3/42* (2006.01)

(52) U.S. Cl. ................ 379/201.06; 707/706; 379/37

(58) Field of Classification Search .......... 379/201.07, 379/201.03, 201.01, 45, 38, 37, 46, 188, 379/196, 93.24, 93.25, 201.06; 709/206; 707/825, 706

See application file for complete search history.

(56) References Cited

U.S. PATENT DOCUMENTS

| | | | |
|---|---|---|---|
| 6,879,668 B2 * | 4/2005 | Neuwald et al. | 379/93.24 |
| 7,573,984 B2 * | 8/2009 | Ger et al. | 379/45 |
| 2010/0135471 A2 * | 6/2010 | Hulls | 379/37 |

* cited by examiner

*Primary Examiner* — Olisa Anwah (74) *Attorney, Agent, or Firm* — Myers Bigel Sibley & Sajovec, P.A.

(57) ABSTRACT

Contact information management is described. In an embodiment, an account can be established for a subscriber to provide contact information for contacting the subscriber in the event that a disaster disrupts a regular communication service of the subscriber. The account can be indexed in a database by associating one or more identifiers for identifying the subscriber with the account, so that the account can be identified based on one or more of the identifiers. The account can be activated when the regular communication service of the subscriber has been disrupted by the disaster, so that the contact information can be provided to a searching person who is attempting to contact the subscriber.

16 Claims, 6 Drawing Sheets

CONTACT INFORMATION MANAGEMENT

BACKGROUND

During the past several years the world has witnessed a large number of disasters. For example each year, there are typically several hurricanes, earthquakes, tornadoes, fires, terrorist attacks, and various other disasters which affect people around the world. Some of these disasters are caused by the forces of nature, while others are caused by humans. However, regardless of the cause, when a disaster strikes normal communication channels are often disrupted, making it difficult or impossible for those people impacted by the disaster to communicate with one another, and/or to let others know where they are and/or how they can be reached.

Most recently, some of the communication problems which can be caused by a disaster were demonstrated when hurricane Katrina struck Louisiana in 2005. After the hurricane destroyed large portions of the state, many people who were impacted by the storm were unable to communicate due to damage caused to communication networks, telephone lines, signal transmission towers, and other items of the communication infrastructure. To further complicate the situation, many personal communication devices such as telephones, mobile phones, computers and/or other devices were lost or destroyed during the storm. As a result, in many cases it would take days, weeks, or even months for those impacted by the storm to once again regain contact with their loved ones, friends, employers, and/or to inform others of alternate ways of contacting them.

SUMMARY

This summary is provided to introduce basic concepts of contact information management which are described further in the Detailed Description. This summary is not intended to identify necessary elements of the claimed subject matter, and is not intended for use in determining the scope of the claimed subject matter.

In an embodiment, an account can be established for a subscriber to provide contact information for contacting the subscriber in the event that a disaster disrupts a regular communication service of the subscriber. The account can be indexed in a database by associating one or more identifiers for identifying the subscriber with the account, so that the account can be identified based on one or more of the identifiers. The account can be activated when the regular communication service of the subscriber has been disrupted by the disaster, so that the contact information can be provided to a searching person who is attempting to contact the subscriber.

BRIEF DESCRIPTION OF THE DRAWINGS

The same numbers are used throughout the drawings when appropriate to reference like features and components.

DETAILED DESCRIPTION

Contact information management is described in which embodiments provide methods and systems for disseminating and/or otherwise making contact information available for individuals/subscribers whose regular communication service has been or may be disrupted due to a disaster.

Embodiments of contact information management provide that an account can be established to maintain contact information which can be used to contact a subscriber in the event that a disaster disrupts a regular communication service of the subscriber. As provided by these techniques, the account can be indexed in a database by associating one or more identifiers for identifying the subscriber with the account, so that the account can be identified based on one or more of the identifiers. For example, the subscriber's home telephone number can be used as an identifier which can be used to identify the account. The account can be activated when the regular communication service of the subscriber has been disrupted by the disaster, so that the contact information can be provided to a searching person who is attempting to contact the subscriber. For example, the searching person can provide the subscriber's home telephone number to locate the account, and then receive the contact information which is included in the account.

Embodiments of contact information management also provide that contact information can be received from a subscriber whose regular communication service has already been disrupted due to a disaster. Once the contact information has been received an account can be established for the subscriber. The account associates one or more identifiers for identifying the subscriber with the contact information received from the subscriber. The account can be indexed in a database, so that the account can be identified based on one or more of the identifiers. For example, the subscriber's home telephone number can be used as an identifier which can be used to identify the account. An inquiry can be received from a searching person who is attempting to contact the subscriber, such that the inquiry includes one or more of the identifiers. The account in the database can be identified based on one or more of the identifiers received as part of the inquiry. For example, the searching person can provide the subscriber's home telephone number as part of the inquiry, and the subscriber's telephone number can then be used to locate the account in the database. The contact information from the account identified can be communicated to the searching person so that the searching person can contact the subscriber.

This document hereby expressly incorporates by reference U.S. patent application Ser. No. 11/214,373 entitled "Accounting for Individuals Before or During a Crisis" to J. Michael Angle et al. which was filed on Aug. 29, 2005 and which claimed priority based on U.S. Provisional Patent Application No. 60/691,923 which was filed on Jun. 17, 2005.

While aspects of the described systems and methods for contact information management can be implemented in any number of different computing systems, environments, and/or configurations, embodiments of contact information management are described in the context of the following exemplary systems and environments.

Figure 1:
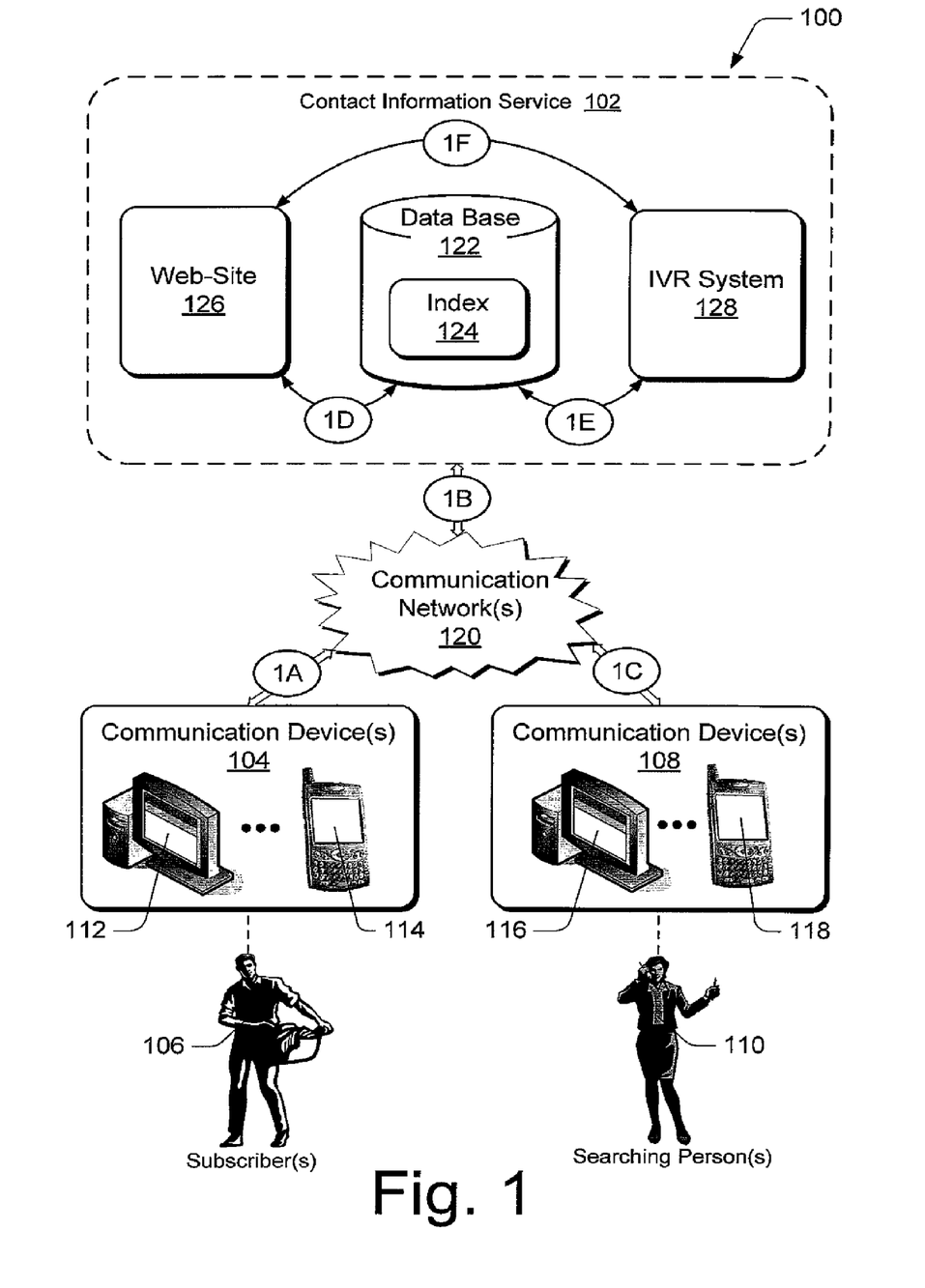
FIG. 1 is a block diagram of an exemplary operating environment in which embodiments of contact information management can be implemented.

FIG. 1 illustrates an exemplary operating environment 100 in which embodiments of contact information management can be implemented. The operating environment 100 includes a contact information service 102, communication device(s) 104 which can be used by subscriber(s) 106, and communication device(s) 108 which can be used by searching person(s) 110. For purposes of illustration, the communication device(s) 104 are shown to include a computing device 112 and/or a hand held device 114 such as a mobile phone. Similarly, for purposes of illustration, the communication device(s) 108 are shown to include a computing device 116 and/or a hand held device 118 such as a mobile phone. Embodiments of contact information management contemplate the use any suitable communication devices. Examples of communication devices which may be adapted for use herein include, but are not limited to, personal computers, microprocessor-based systems, network personal computers, minicomputers, hand-held computing devices, telephones (land-line), mobile telephones, and/or personal digital assistants (PDAs).

In the context of this document, a subscriber 106 can be any person who can be or who has been impacted by a disaster, and/or any person whose regular communication service can be and/or has been disrupted due to a disaster. Further, in the context of this document, a searching person 110 can be any person who is attempting to contact the subscriber and/or who may be interested in status and/or contact information for the subscriber if a disaster occurs.

The communication device(s) 104 and 108, which can be used respectively by the subscriber(s) 106 and the searching person(s) 110, can communicate with the contact information service 102 via communication network(s) 120. For purposes of illustration, the communication network(s) 120 is illustrated as a single communication network. However, embodiments of contact information management contemplate communication via any number, combination, and/or type of communication networks which are capable of establishing a communication link(s) between the communication device(s) 104 and/or 108 and the contact information service 102. The communication network(s) can include wired portions, wireless portions, and/or a combination of wired and wireless portions. Examples of communication networks which may be adapted for use include, but are not limited to, local area network(s) (LANs), wide area network(s) (WANs), the Internet, the world-wide-web (WWW), public switched telephone networks, land-line telephone networks, mobile phone networks, and/or satellite networks.

Although FIG. 1 does not show particular individual communication streams between the contact information service 102 and the devices 104 and 106, the arrowed communication links 1(A-C) generally represent various communication links between these elements which can include such individual communication streams. These communication streams can include data streams, voice streams, and/or video streams. Additionally, it is contemplated that any one or more of the arrowed communication links 1(A-C) can facilitate one-way or two-way communication. For example, arrowed communication link 1A can facilitate two-way communications between the communication device(s) 104 and the communication network 120. Arrowed communication link 1B can facilitate two-way communications between the communication network(s) 120 and the contact information service 102. Similarly, arrowed communication link 1C can facilitate two-way communications between the communication network(s) 120 and the communication device(s) 108. It should be appreciated that these communications may take the form of voice messages, e-mails, or other forms of messages recorded by one party for later access and retrieval by another party.

The contact information service 102 can reside on a designated computing system and/or device, or the contact information service 102 can be distributed across one or more computer systems and/or computing networks and/or devices. The contact information service 102 can include a data base 122 which is associated with an index 124. The index 124 can be included within the data base 122, can be communicatively coupled with the data base 122, and/or can be distributed at various locations in the contact information service 102. The contact information service 102 can also include a Web-site 126 and an interactive voice response (IVR) system 128.

For purposes of illustration, the data base 122 is shown as a single data store. However, embodiments of contact information management contemplate the data base 122 can be distributed across any number, combination, and/or type of suitable data stores which are capable of maintaining stored data. Examples of data stores which may be adapted for use herein include, but are not limited to, removable/non-removable computer storage media, volatile/non-volatile computer storage media, read only memory (ROM), random access memory (RAM), hard discs, magnetic disks (e.g., floppy discs), magnetic tapes, and/or optical discs. The data base 122 may maintain contact information associated with subscriber 106 which can be used for contacting subscriber(s) 106 whose normal service may be disrupted. The data base 122 may also maintain status information regarding the subscriber(s) 106. The subscriber 106 may provide his or her contact information and/or status information via the Web-site 126, via the IVR system 128, via interaction with a live attendant, and/or by any other suitable means for communicating his or her contact information to the contact information service 102.

Although FIG. 1 does not show specific, individual communication streams within the contact information service 102, the arrowed communication links 1(D-F) represent such communication streams. These streams may include data streams, audio streams, and/or video streams. Additionally, it is contemplated that any one or more of the arrowed communication links 1(D-F) can facilitate one-way and/or two-way data communication. For example, arrowed communication link 1D can facilitate two-way communications between the data base 122 and the Web-site 126. Arrowed communication link 1E can facilitate two-way communications between the data base 122 and the IVR system 128. Similarly, arrowed communication link 1F can facilitate two-way communications between the Web-site 126 and the IVR system 128. As a result of this two-way communication the data base 122, Web-site 126, and IVR system 128 can operate together as a cohesive contact information service 102 to receive information, update the data base 122, and provide information as described herein.

Figure 2:
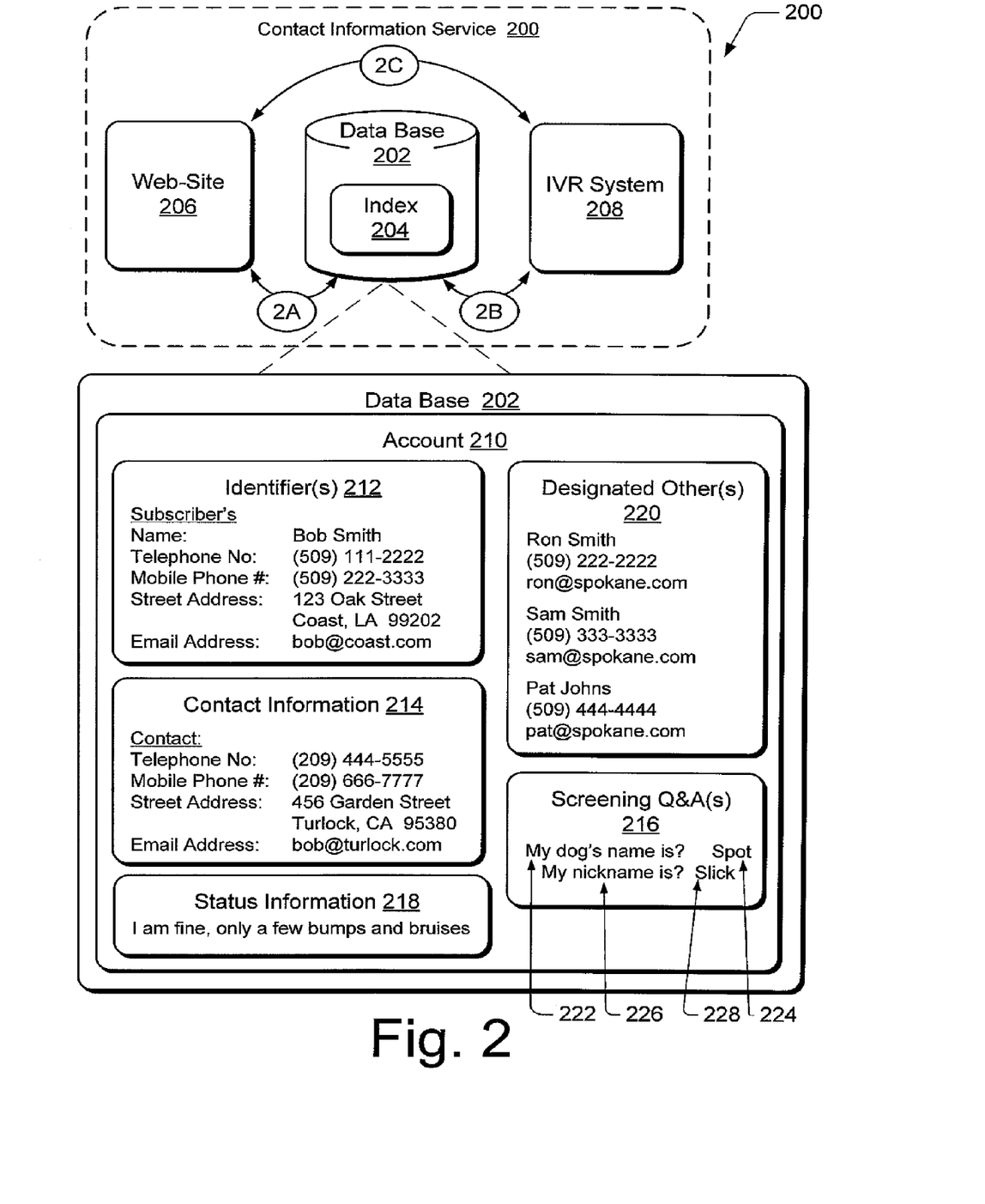
FIG. 2 is a block diagram of an exemplary contact information service in which further aspects of embodiments of contact information management are described.

FIG. 2 illustrates an exemplary contact information service 200 in which further aspects of embodiments of contact information management are described. The exemplary contact information service 200 can be situated within an environment such as the exemplary operating environment described with reference to FIG. 1. Accordingly, the exemplary contact information service 200 can be communicatively coupled to communication network(s) and communication devices and/or any other elements which were described with reference to FIG. 1.

The contact information service 200 can reside on a designated computing system and/or device, or it can be distributed across one or more computer systems and/or computing networks and/or devices. The contact information service 200 can include a data base 202 which is associated with an index 204. The index 204 can be included within the data base 202, can be communicatively coupled with the data base 202, and/or can be distributed at various locations in the contact information service 200. The contact information service 200 can also include a Web-site 206 and an interactive voice response (IVR) system 208.

Within the contact information service 200, arrowed communication links 2(A-C) illustrate various communication links which can communicate data streams, audio streams, and/or video streams. Additionally, it is contemplated that any one or more of the arrowed communication links 2(A-C) can facilitate one-way and/or two-way data communication. For example, arrowed communication link 2A can facilitate two-way communications between the data base 202 and the Web-site 206. Arrowed communication link 2B can facilitate two-way communications between the data base 202 and the IVR system 208. Similarly, arrowed communication link 2C can facilitate two-way communications between the Web-site 206 and the IVR system 208. As a result of this two-way communication the data base 202, Web-site 206, and IVR system 208 can operate together as a cohesive contact information service 200 to receive information, update the data base 202, and provide information as described herein.

As illustrated in FIG. 2, an account 210 has been established for a subscriber (e.g., subscriber 106 of FIG. 1), and information associated with the account 210 has been included in the data base 202. The account 210 can be established by registering status and/or contact information with the contact information service 200. For example, the subscriber (e.g., 106) may simply provide status information (e.g., that he/she is alive, is injured, etc.) and/or the subscriber (e.g., 106) may provide information regarding how he/she can be contacted (e.g., a contact telephone number, a contact email address, etc.). In various implementations, information can be provided prior to the occurrence of a disaster, during the occurrence of the disaster, and/or after the disaster has occurred.

As shown, the account 210 can include identifiers 212, contact information 214, screening questions and answers 216, status information 218, and a list of designated others 220. The account can be based on and/or indexed to a subscriber's name, a telephone number, a mobile phone number, a street address, and/or any other suitable identifiers 212 as described herein. The account 210 can also be automatically established for the subscriber (e.g., 106) when the normal/regular communication service used by the subscriber (e.g., 106) has been disrupted for a predetermined time period, or can be automatically established when the normal/regular communication service of the subscriber (e.g., 106) has been disrupted due to a disaster.

The identifiers 212 can include any data that can be used to identify the account 210. For example, the identifiers 212 can include information about a subscriber (e.g., 106) such as: the subscriber's name, the subscriber's telephone number, the subscriber's mobile phone number, the subscriber's street address, the subscriber's email address, and/or any other data that can be used to identify the account 210 as belonging to the subscriber (e.g., 106). One or more of the identifiers 212 can be used to index the account 210 in the data base 202, so that the account can be identified by entering one or more of the identifier(s) 212. For example, if the account 210 is indexed to the subscriber's telephone number, a searching person (e.g., searching person 110 of FIG. 1) can provide the subscriber's telephone number to the contact information service 200 so that the contact information service 200 can locate the account 210 in the data base 202. As another example, if the account 210 is indexed to the subscriber's name, a searching person (e.g., 110 of FIG. 1) can provide the subscriber's name to the contact information service 200 so that the contact information service 200 can locate the account 210 in the data base 202, and so forth. In an embodiment, if multiple accounts are identified by the contact information service 200 based on the identifier 212 provided by a searching person (e.g., multiple accounts associated with the name "Bob Smith"), the contact information service 200 may prompt the searching person (e.g., 110) for another identifier 212 associated with the subscriber (e.g., 106) to identify the account 210 from the multiple accounts initially identified that is associated with the subscriber (e.g., 106) whom the searching person (e.g., 110) is trying to contact.

In FIG. 2, the account 210 has been established for a subscriber (e.g., 106) named "Bob Smith". In this example, the identifiers 212 include the subscriber's name "Bob Smith", the subscriber's telephone number "(509) 111-2222", the subscriber's mobile phone number "(509) 224-3333", the subscriber's street address "123 Oak Street, Coast, La. 99202", and the subscriber's email address "bob@coast.com". If the account 210 has been indexed to each of these identifiers 212, then any one of these identifiers 212 can be provided by a searching person (e.g., 110) and used by the contact information service 200 to identify the account 210 in the data base 202.

The account 210 can also include contact information 214 which can be used to contact the subscriber (e.g. 106) if the regular communications are not working. The contact information 214 can include any data that can be used to contact the subscriber (e.g., 106). For example, the contact information 214 can include information for contacting the subscriber (e.g., 106) whose normal service has been disrupted, such as: a contact telephone number, a contact mobile phone number, a contact street address, a contact email address, and/or any other data that can be used to contact the subscriber (e.g., 106). The contact information 214 can be temporary contact information such as the phone number for a relative's home where the subscriber (e.g., 106) is temporarily staying, a new permanent phone number established by the subscriber (e.g., 106), and/or any other type of contact information which will allow a searching person (e.g., 110) to get into contact with the subscriber (e.g., 106).

In FIG. 2, the account 210 has been established for the subscriber (e.g., 106) named "Bob Smith". In this example, the alternate contact information 214 for contacting the subscriber (e.g., 106) named "Bob Smith" includes a contact telephone number "(209) 444-5555", a contact mobile phone number "(209) 666-7777", a contact street address "456 Garden Street, Turlock, Calif. 95380", and a contact email address "bob@turlock.com". Any one of the contact information 214 items listed can be provided to a searching person (e.g., 110) in response to receiving one or more identifiers 212 associated with the subscriber (e.g., 106) and can be used to get into contact with the subscriber (e.g., 106).

The account 210 can also include screening questions and answers 216 which can be used to limit access to the information in the account 210 to those searching persons (e.g., 110) who are able to provide the correct answers in response to the screening questions. The screening questions and answers 216 can be provided by the subscriber (e.g., 106) when the account is established, and/or can be provided by the subscriber (e.g., 106) at some other time. The screening questions and answers 216 can also be changed and/or modified at any time by the subscriber (e.g., 106).

The level of information security provided by the screening questions and answers 216 can be tailored as desired by the subscriber (e.g., 106). For instance, the vetting of searching persons (e.g., 110) can be as stringent or as easy as the subscriber (e.g., 106) desires. For example, if the subscriber (e.g., 106) is not concerned with limiting access to the contact information 214 of the account 210, the screening questions and answers 216 can be omitted completely. On the other hand, if the subscriber (e.g., 106) wants to make sure that only searching persons (e.g., 110) who are very familiar with the subscriber (e.g., 106) can access the contact information 214 of the account 210, the subscriber (e.g., 106) can include a long list of difficult screening questions which can only be answered correctly by those who are very familiar with the subscriber (e.g., 106). The subscriber (e.g., 106) can also craft screening questions and answers 216 which can be answered by those searching persons (e.g., 110) who have a general familiarity with the subscriber (e.g., 106). In one implementation, the contact information service 200 allows the searching person (e.g., 110) to send email and/or voice messages to an anonymous address linked to the subscriber (e.g., 106), thereby protecting the privacy of the contact information 214.

In FIG. 2, the account 210 has been established for the subscriber (e.g., 106) named "Bob Smith". In this example, two screening questions and answers 216 are listed. The first screening question 222 is "My dog's name is?", and the associated answer 224 is "Spot". The second screening question 226 is "My nickname is?", and the associated answer 228 is "Slick".

The account 210 can also include status information 218. The status information 218 can be provided by the subscriber (e.g., 106) and/or by another person on behalf of the subscriber (e.g., 106). The status information 218 can describe the health and/or condition of the subscriber (e.g., 106). For example, in the illustrated example, the status information 218 provides a simple statement "I am fine, only a few bumps and bruises". The status information 218 can also include information regarding the current location of the subscriber (e.g., 106) such as, for example, that the subscriber (e.g., 106) is in a particular hospital. However, the status information 218 can provide any level of detail desired by the subscriber (e.g., 106).

The account 210 can also include a list of designated others 220. The list of designated others 220 can be provided by the subscriber (e.g., 106), and can list one or more people who are to automatically receive the contact information 214 and/or status information 218 if a disaster occurs. For example, the contact information 214 and/or status information 218 can be pushed to the designated others 220 by sending email messages, text messages, and/or recorded and/or computer generated telephone messages to some or all of the designated others 220 when a disaster occurs. This message sent to the designated other 220 can include some or all of the contact information 214, some or all of the status information 218, and/or can include other information regarding the disaster. Thus, in one implementation the list of designated others 220 can be provided by the subscriber (e.g., 106). As illustrated in FIG. 2, the list of designated others 220 includes three people who are to automatically receive the contact information 214 and/or status information 218 if a disaster occurs. For purposes of illustration, the first person in the list of designated others 220 is named "Ron Smith", the second person is named "Sam Smith", and the third person is named "Pat Johns".

In another implementation, the contact information service 200 can access the subscriber's email address book and/or some other list of contacts to generate a list of designated others 220 which are to receive the contact information 214 and/or status information 218. The contact information service 200 can then push the contact information 214 and/or the status information 218 to some or all of the addresses listed in the email address book. This message can include some or all of the contact information 214 and/or some or all of the status information.

In another implementation, the contact information service 200 can play an auto-generated message to searching person(s) (e.g., 110) who attempt to call a subscriber (e.g., 106) whose regular phone service has been disrupted and/or is otherwise out of service. Similarly, the contact information service 200 can generate automatic email response messages which are communicated to searching person(s) (e.g., 110) who attempt to email a subscriber (e.g., 106) whose regular email service has been disrupted and/or is otherwise out of service. These auto-generated messages and/or automatic email response messages can provide information about the contact information service 200 and/or other information related to the disaster and/or related to the subscriber (e.g., 106).

With this background, and with general reference to FIGS. 1 and 2, one can appreciate various implementations of contact information management. For example, in one implementation, as part of disaster preparedness, an account 210 can be established for a subscriber 106. In one implementation, the account 210 itself can be established prior to receiving any information from the subscriber (e.g., 106). For example, an on-line directory can offer this as an additional service associated with a directory listing, so that the subscriber (e.g., 106) will have the option of adding alternate contact information 210 to their existing account in the event of a disaster. In another implementation, the account 210 can include alternate contact information 214 which can be used to contact the subscriber 106 if regular communication service for the subscriber 106 is disrupted. The contact information 214 can be included in the database 202. The index 204 associates one or more identifiers 212 with the account 210, so that the account 210 can be identified in the data base 202 based on one or more of the identifiers 212. The account 210 can be activated if the regular communication service of the subscriber 106 is disrupted by a disaster, so that the contact information 214 can be provided to a searching person 110 who is attempting to contact the subscriber 106.

In another implementation, contact information 214 is received from the subscriber 106 after the subscriber's regular communication service has been disrupted due to a disaster. For example, the subscriber 106 can use any telephone and/or computer and/or other suitable communication device 104 to provide the contact information 214 to the contact information service 200. An account 210 can be established for the subscriber 106 which associates one or more identifiers 212 for identifying the subscriber 106 with the contact information 214 which is received from the subscriber 106. The index 204 associates the contact information 214 which is included the database 202 with on one or more of the identifiers 212 which can be used to search the database 202. A searching person 110 who is attempting to contact the subscriber 106 can submit an inquiry which includes one or more of the identifiers 212, and the account 210 in the database 122 can be identified based on one or more of the identifiers 212 which were received as part of the inquiry. Once the account 210 has been identified, the contact information 214 for the subscriber 106 can be communicated to the searching person 110. These and other implementations of contact information management are described in further detail herein. It should be appreciated that implementations of the database 202 may include some or all of the described fields, and/or may include fields other than those shown in FIG. 2.

The contact information service 200 can use any suitable means to determine whether a subscriber's 106 regular communication service has been disrupted. For example, in one implementation the contact information service 200 may periodically and/or continuously monitor (either directly or indirectly) the subscriber's 106 regular communication service(s) for outages/disruptions. In some cases the contact information service 200 may be associated with and/or part of the services provided by a provider of the subscriber's 106 regular communication service(s), while in other cases the contact information service 200 may be separate from the regular communication service(s) which may be provided by one or more separate service providers. In another implementation the contact information service 200 may receive notification from the subscriber's 106 regular communication service provider(s) and/or from some other party when there is a service outage and/or disruption of the subscriber's 106 regular communication service(s). In yet another implementation the contact information service 200 may receive a notification or warning from an emergency service regarding a disaster and/or potential threat, and in response to the notification the contact information service 200 may monitor for disruptions/outages which affect the subscriber's 106 regular communication service.

The contact information service 200 can be informed of the subscriber's 106 regular communication service(s) 200 using any suitable means. For example, the contact information service 200 can be associated with and/or part of the services provided by a provider of the subscriber's 106 regular communication service(s). In this case, the provider will know and provide the regular communication service(s) of the subscriber 106, and will be aware of disruptions and/or outages affecting the service(s). In another implementation, the regular communication service(s) 200 of the subscriber 106 may be provided to the contact information service 200 by the subscriber 106 and/or by some other party. The information regarding the regular communication service(s) 200 of the subscriber 106 may be provided to the contact information service 200 before the account 210 is established for the subscriber 106, when the account 210 is established for the subscriber 106, an/or after the account 210 is established for the subscriber 106.

Figure 3:
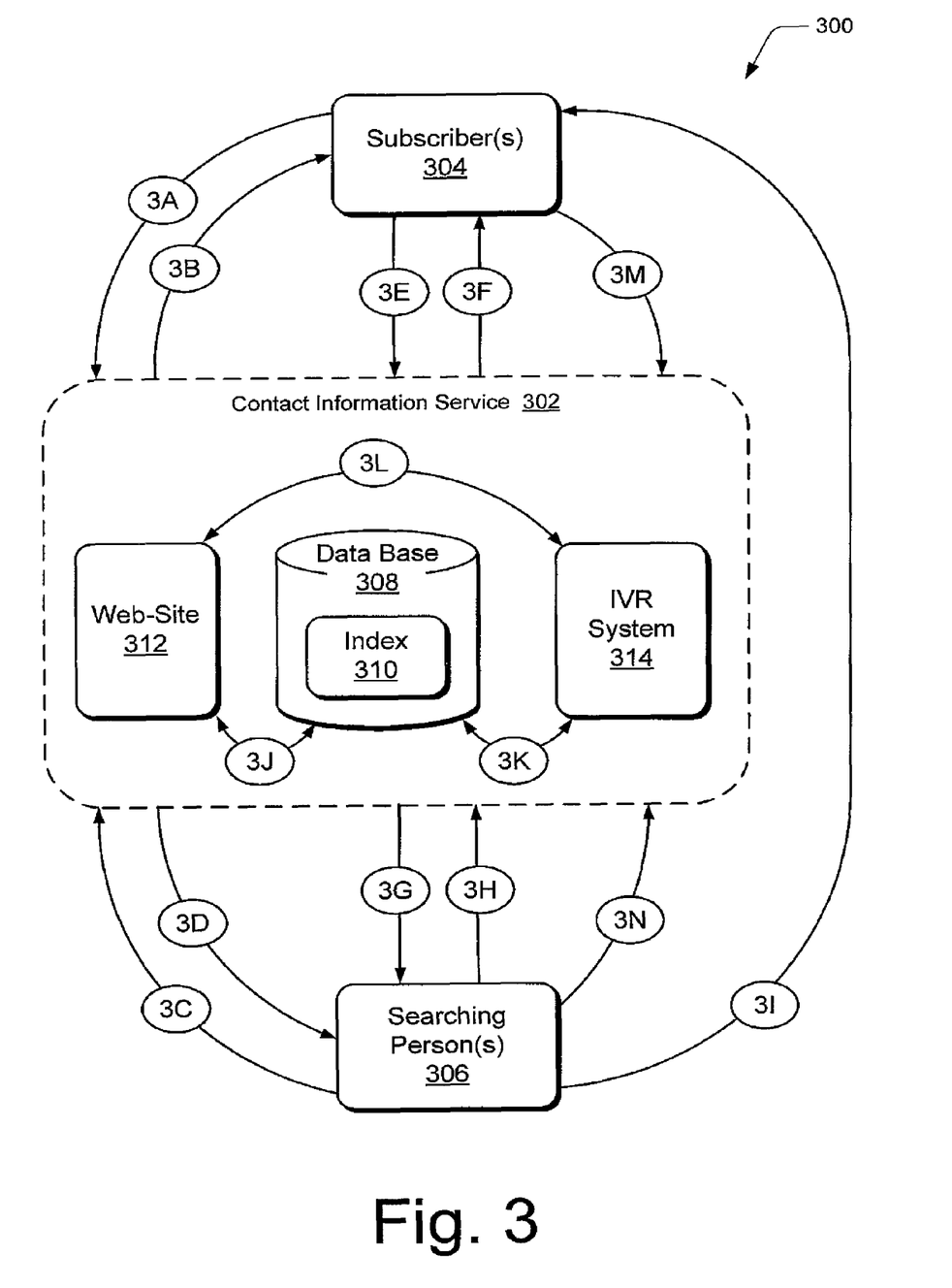
FIG. 3 is a block diagram of an exemplary operating environment in which further aspects of embodiments of contact information management are described.

FIG. 3 illustrates an exemplary operating environment 300 in which further aspects of embodiments of contact information management are described. The operating environment 300 includes a contact information service 302, subscriber(s) 304, and searching person(s) 306. The exemplary operating environment 300 can include any of the components, communication links, and/or other elements described with reference to FIGS. 1 and 2. However, some of these details have been omitted from FIG. 3 in order to primarily focus on streams of communication. For example, although the subscriber(s) 304, and the searching person(s) 306 are each using some sort of communication device(s) to send and receive communications, these communication device(s) are not shown in FIG. 3. FIG. 3 illustrates various communication streams between the contact information service 302, the subscriber(s) 304, and the searching person(s) 306. These communication streams can communicate data streams, audio streams, and/or video streams.

The contact information service 302 can reside on a designated computing system and/or device, or it can be distributed across one or more computer systems and/or computing networks and/or devices. The contact information service 302 can include a data base 308 which is associated with an index 310. The index 310 can be included within the data base 308, can be communicatively couple with the data base 308, and/or can be distributed at various locations in the contact information service 302. The contact information service 302 can also include a Web-site 312 and an interactive voice response (IVR) system 314.

Various communication streams are now described in detail. In one implementation, a regular communication service (e.g., land-line phone service, mobile phone service, and/or email service) for subscriber 304 has been disrupted due to some sort of disaster, and as illustrated by communication stream 3A, the subscriber 304 contacts the contact information service 302 using any suitable non-disrupted communication device (e.g., 104 of FIG. 1) and provides contact information (e.g., 214) which can be used by searching person(s) 306 to reach the subscriber 304.

The contact information service 302 can also communicate with the subscriber 304 as illustrated by communication stream 3B. For example, in one implementation the subscriber 304 can call the contact information service 302 and be connected to the IVR system 314. In this case, the IVR system 314 can interact with the subscriber 304, and ask the subscriber 304 for various information which can be used to establish an account (e.g., 210) for the subscriber 304. In another implementation, the subscriber 304 can navigate to the Web-site 312 of the contact information service 302. The Web-site 312 can be configured to interact with the subscriber 304, and to ask the subscriber 304 for various information which can be used to establish an account (e.g., 210) for the subscriber 304. In either case, two-way communication can take place between the subscriber 304 and the contact information service 302 as shown respectively by communication streams 3A and 3B.

The account established for the subscriber associates one or more identifiers (e.g., 212) for identifying the subscriber 304 with the contact information (e.g., 214) received from the subscriber 304. The account (e.g., 210) is then indexed so that the account (e.g., 210) can be identified in the data base 308 based on one or more of the identifiers (e.g., 212).

As illustrated by communication stream 3C, a searching person 306 can contact the contact information service 302 using any suitable communication device (e.g., 108 of FIG. 1) to find out if contact information (e.g., 214) is available for the subscriber 304. The inquiry received from the searching person 306 can include one or more of the identifiers (e.g., 212) which can be used by the contact information service 302 to identify the subscriber's 304 account in the data base 308.

The contact information service 304 can also communicate with the searching person 306 as illustrated by communication stream 3D. For example, in one implementation the searching person 306 can call the contact information service 302 and be connected to the IVR system 314. In this case, the IVR system 314 can interact with the searching person 306, to request various information which can be used to identify the subscriber's 304 account in the data base 308 and/or to otherwise locate contact information (e.g., 214) for the subscriber 304. In another implementation, the searching person 306 can navigate to the Web-site 312 of the contact information service 302. The Web-site 312 can be configured to interact with the searching person 306, and to request various information which can be used to identify the subscriber's 304 account in the data base 308 and/or to otherwise locate contact information (e.g., 214) for the subscriber 304. In either case, two-way communication can take place between the searching person 306 and the contact information service 302 as shown respectively by communication streams 3C and 3D. In one implementation, the contact information (e.g., 214) includes a voice message recorded by the subscriber 304, and recorded voice message can be played to the searching person 306 via the IVR system 314 and/or via the Web-site 312.

In one implementation, the subscriber 304 can submit screening questions and associated answers (e.g., 216) which can be used to limit access to the contact information (e.g., 214) which is available at the contact information service 302 to those searching person(s) 306 who are able to provide the associated answers. As illustrated by communication stream 3E, the subscriber 304 can provide the screening questions and associated answers (e.g., 216) which are to be used by the contact information service 302 to limit access to the contact information (e.g., 214). Once again, the subscriber 304 can call the contact information service 302 and be connected to the IVR system 314 with can interact with the subscriber 304 to gather the screening questions and associated answers (e.g., 216) from the subscriber 304. Alternatively, the subscriber 304 can navigate to the Web-site 312 of which can interact with the subscriber 304 to gather the screening questions and associated answers (e.g., 216). In either case, two-way communication can take place between the subscriber 304 and the contact information service 302 as shown respectively by communication streams 3E and 3F.

When the subscriber 304 has submitted screening questions and associated answers (e.g., 216) to limit access to the contact information (e.g., 214) which is available at the contact information service 302, the screening questions (e.g., 222 and/or 226) can be communicated to the searching person 306 as illustrated by communication stream 3G. The searching person 306 can communicate answers (e.g., 224 and/or 228) to the screening questions as illustrated by communication stream 3H. Once again, the searching person 306 can call the contact information service 302 and be connected to the IVR system 314 with can interact with the searching person 306 to present the screening questions and to receive answers from the searching person 306. Alternatively, the searching person 306 can navigate to the Web-site 312 of which can interact with the searching person 306 to present the screening questions and to receive answers from the searching person 306. In either case, two-way communication can take place between the searching person 306 and the contact information service 302 as shown respectively by communication streams 3G and 3H.

Once the subscriber's 304 account (e.g., 210) has been identified, and any applicable screening questions (e.g., 222 and/or 226) have been correctly answered by the searching person 306, the contact information (e.g., 214) from the subscriber's account (e.g., 210) can be communicated to the searching persons 306, so that the searching person 206 can contact the subscriber 304. Communication stream 3D can represent the contact information being communicated from the contact information service 302 to the searching person 306. After receiving the contact information (e.g., 214) from the contact information service 302, the searching party 306 can use the contact information to communicate with the subscriber 304 as illustrated by communication stream 3I.

Within the contact information service 302, arrowed communication links 3(J-L) illustrate various communication links which can communicate data streams, audio streams, and/or video streams. Additionally, it is contemplated that any one or more of the arrowed communication links 3(J-L) can facilitate one-way and/or two-way data communication. For example, arrowed communication link 3J can facilitate two-way communications between the data base 308 and the Web-site 312. Arrowed communication link 2K can facilitate two-way communications between the data base 308 and the IVR system 314. Similarly, arrowed communication link 2L can facilitate two-way communications between the Web-site 312 and the IVR system 314. As a result of this two-way communication the data base 308, Web-site 312, and IVR system 314 can operate together as a cohesive contact information service 302 to receive information, update the data base 308, and provide information as described herein.

In one implementation, the Web-site 312 can host a bulletin board, host a blog, list alerts, list frequently asked questions and answers, and/or provide other information related to the disaster. Communication stream 3M can represent communications from the subscriber 304 with are posted on the bulletin board, added to the blog, and/or otherwise made available via the Web-site 312. Similarly, Communication stream 3N can represent communications from the searching party 306 with are posted on the bulletin board, added to the blog, and/or otherwise made available via the Web-site 312.

Methods for contact information management, such as exemplary methods 400 and 500 described with reference to respective FIGS. 4 and 5, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
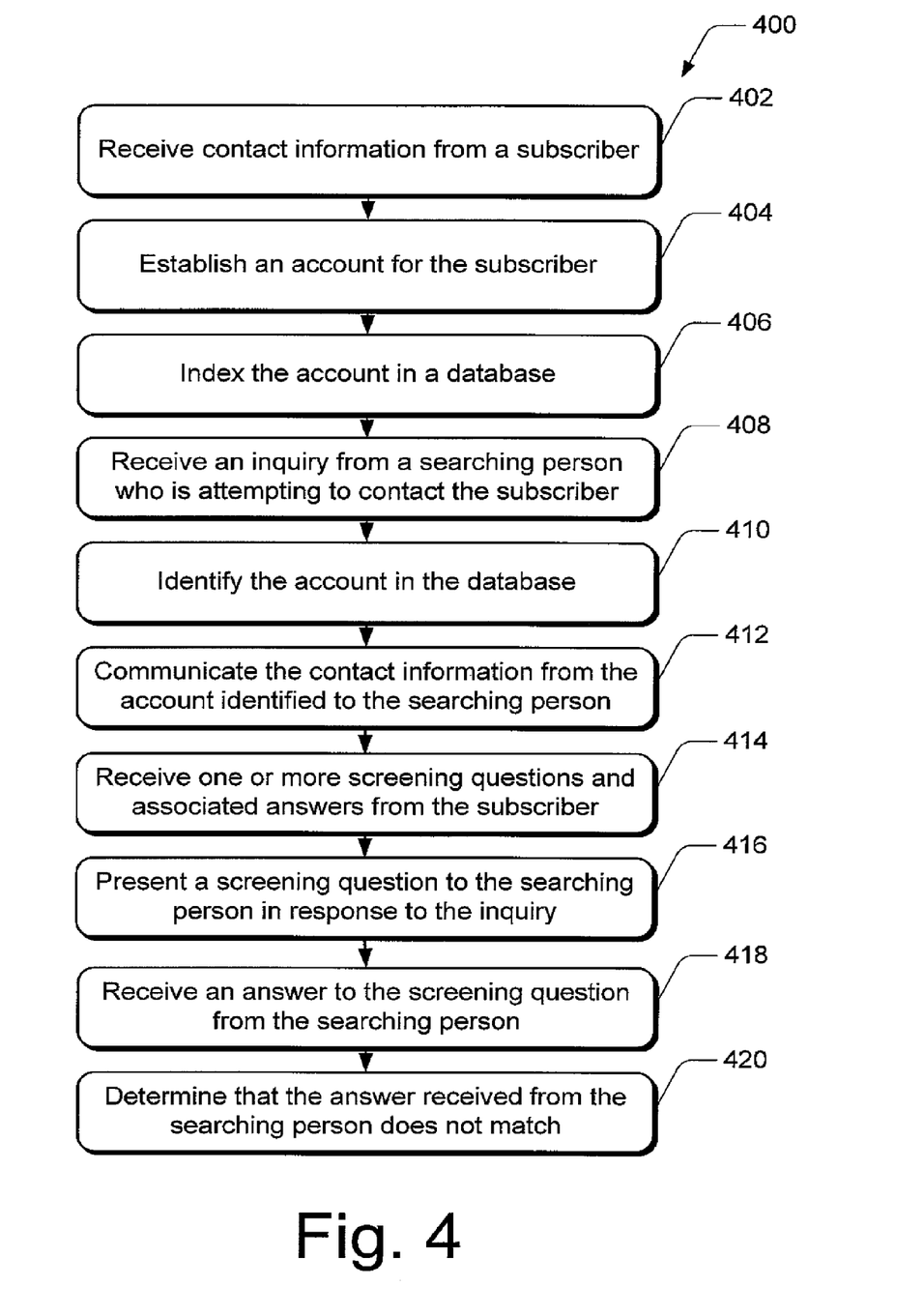
FIG. 4 is a flow diagram illustrating exemplary method(s) for contact information management.

FIG. 4 is a flow diagram illustrating exemplary method(s) 400 for contact information management and is described with reference to the exemplary contact information service 200 shown in FIG. 2, and the exemplary operating environment 300 shown in FIG. 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

Block 402 represents receiving contact information from a subscriber whose regular communication service has been disrupted due to a disaster. For example, contact information 214 can be received from a subscriber 304 (e.g., Bob Smith) whose regular communication service has been disrupted due to a disaster. The contact information 214 can be communicated from the subscriber 304 to the contact information service 302 as illustrated by communication stream 3A.

Block 404 represents establishing an account for the subscriber which associates one or more identifiers for identifying the subscriber with the contact information received from the subscriber. For example, account 210 can be established for the subscriber 304 (e.g., "Bob Smith") which associates one or more identifiers 212 (such a home phone number "(509) 111-2242" for subscriber "Bob Smith") for identifying the subscriber 106 with the contact information 214 (e.g., a contact phone number "(209) 444-5555" for subscriber "Bob Smith") received from the subscriber 106.

Block 406 represents indexing the account in a database, so that the account can be identified based on one or more of the identifiers. For example, the account 210 can be indexed in a database 202 using one or more of identifiers 212, so that the account 210 can be identified based on one or more of the identifiers 212.

Block 408 represents receiving an inquiry from a searching person who is attempting to contact the subscriber. The inquiry includes one or more of the identifiers. For example, an inquiry which includes one or more identifiers 212 can be received from a searching person 306 who is attempting to contact the subscriber 304 (e.g., subscriber "Bob Smith"). The inquiry can be communicated from the searching person 306 to the contact information service 302 as illustrated by communication stream 3C.

Block 410 represents identifying the account in the database based on one or more of the identifiers received as part of the inquiry. For example, the account 210 can be identified in the database 202 based on one or more of the identifiers 212 (e.g., the home phone number "(509) 111-2242" for subscriber "Bob Smith") which is received as part of the inquiry.

Block 412 represents communicating the contact information from the account identified to the searching person so that the searching person can contact the subscriber. For example, the contact information 214 (e.g., a contact telephone number "(209) 444-5555" for subscriber "Bob Smith") from the account 210 identified can be communicated to the searching person 110 so that the searching person 110 can contact the subscriber 106. The contact information 214 can be communicated from the contact information service 302 to the searching person 306 as illustrated by communication stream 3D.

Block 414 represents receiving one or more screening questions and associated answers from the subscriber, so that the screening questions can be used to control access to the contact information. For example, one or more screening questions and associated answers 216 can be received from the subscriber 106, so that the screening questions (e.g., 222 and 226) can be used to control access to the contact information 214. The screening questions and answers 216 can be communicated as illustrated by communication stream 3E.

Block 416 represents presenting a screening question to the searching person in response to the inquiry. For example, a screening question 222 (e.g., "My dog's name is?") can be presented to the searching person 306 in response to the inquiry. The screening question 222 can be communicated from the contact information service 302 to the searching person 306 as illustrated by communication stream 3G.

Block 418 represents receiving an answer to the screening question from the searching person. For example, an answer to the screening question 222 can be received from the searching person 306, and this answer can the correct answer "Spot", or it can be something other than "Spot". The answer to the screening question 222 can be communicated from the searching person 306 to the contact information service 302 as illustrated by communication stream 3H.

Block 420 represents determining that the answer received from the searching person does not match the associated answer provided by the subscriber and that the contact information from the account identified will not be communicated to the searching person. For example, if it is determined that the answer received from the searching person 306 does not match the associated answer (e.g., "Spot") provided by the subscriber 304, then the contact information 214 from the account 210 identified will not be communicated to the searching person 306. In an embodiment, the contact information service 302 may notify the searching person 306 that access to the contact information 214 associated with the subscriber 304 has been denied.

Figure 5:
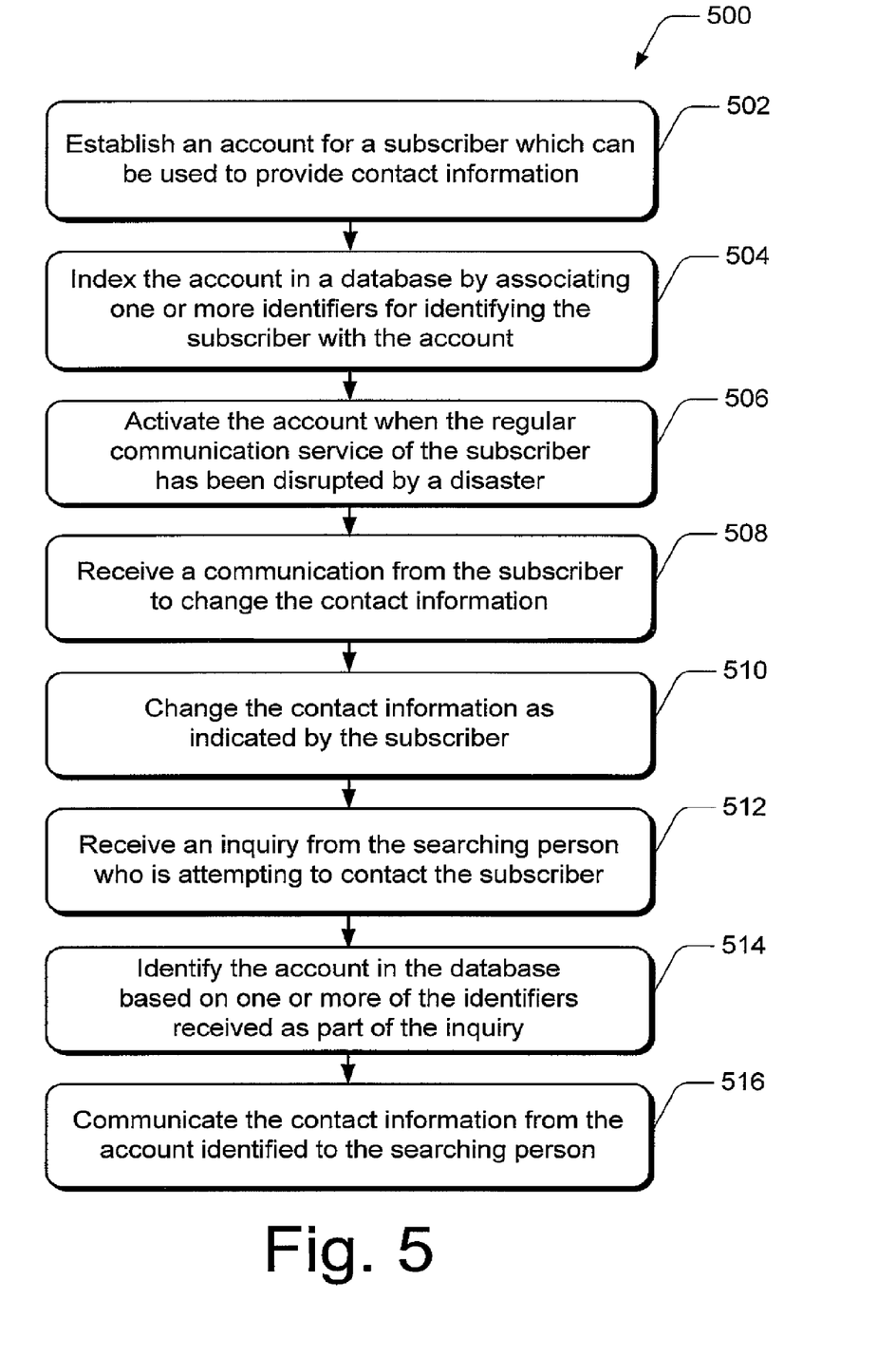
FIG. 5 is a flow diagram illustrating exemplary method(s) for contact information management.

FIG. 5 is a flow diagram illustrating exemplary method(s) 500 for contact information management and is described with reference to the exemplary contact information service 200 shown in FIG. 2, and the exemplary operating environment 300 shown in FIG. 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

Block 502 represents establishing an account for a subscriber, so that the account can be used to provide contact information for contacting the subscriber in the event that a disaster disrupts a regular communication service of the subscriber. For example, account 210 can be established for a subscriber 304 (e.g., subscriber "Bob Smith"), so that the account 210 can be used to provide contact information 214 for contacting the subscriber 304 in the event that a disaster disrupts a regular communication service of the subscriber 304.

Block 504 represents indexing the account in a database by associating one or more identifiers for identifying the subscriber with the account, so that the account can be identified based on one or more of the identifiers. For example, the account 210 can be indexed in a database 202 using one or more of identifiers 212, so that the account 210 can be identified based on one or more of the identifiers 212.

Block 506 represents activating the account when the regular communication service of the subscriber has been disrupted by a disaster, so that the contact information can be provided to a searching person who is attempting to contact the subscriber. For example, the account 210 can be activated when the regular communication service of the subscriber 304 (e.g. subscriber "Bob Smith") has been disrupted by a disaster, so that the contact information 214 can be provided to a searching person 306 who is attempting to contact the subscriber 304.

Block 508 represents receiving a communication from the subscriber to change the contact information. For example, a communication can be received from the subscriber 304 (e.g. subscriber "Bob Smith") to change the contact information 214 is the subscriber 304 gets a new telephone number or moves in with relative or friends, and/or has other contact information to update. The communication to change the contact information can be communicated from the subscriber 304 to the contact information service 302 as illustrated by communication stream 3A.

Block 510 represents changing the contact information as indicated by the subscriber. For example, the contact information 214 can be changed as indicated by the subscriber 304.

Block 512 represents receiving an inquiry from the searching person who is attempting to contact the subscriber. The inquiry includes one or more of the identifiers. For example, an inquiry which includes one or more identifiers 212 can be received from a searching person 306 who is attempting to contact the subscriber 304. The inquiry can be communicated from the searching person 306 to the contact information service 302 as illustrated by communication stream 3C.

Block 514 represents identifying the account in the database based on one or more of the identifiers received as part of the inquiry. For example, the account 210 can be identified in the database 202 based on one or more of the identifiers 212 (e.g., the home phone number "(509) 111-2242" for subscriber "Bob Smith") which is received as part of the inquiry.

Block 516 represents communicating the contact information from the account identified to the searching person so that the searching person can contact the subscriber. For example, the contact information 214 (e.g., a contact telephone number "(209) 444-5555" for subscriber "Bob Smith") from the account 210 identified is communicated to the searching person 110 so that the searching person 110 can contact the subscriber 106. The contact information 214 can be communicated from the contact information service 302 to the searching person 306 as illustrated by communication stream 3D.

Figure 6:
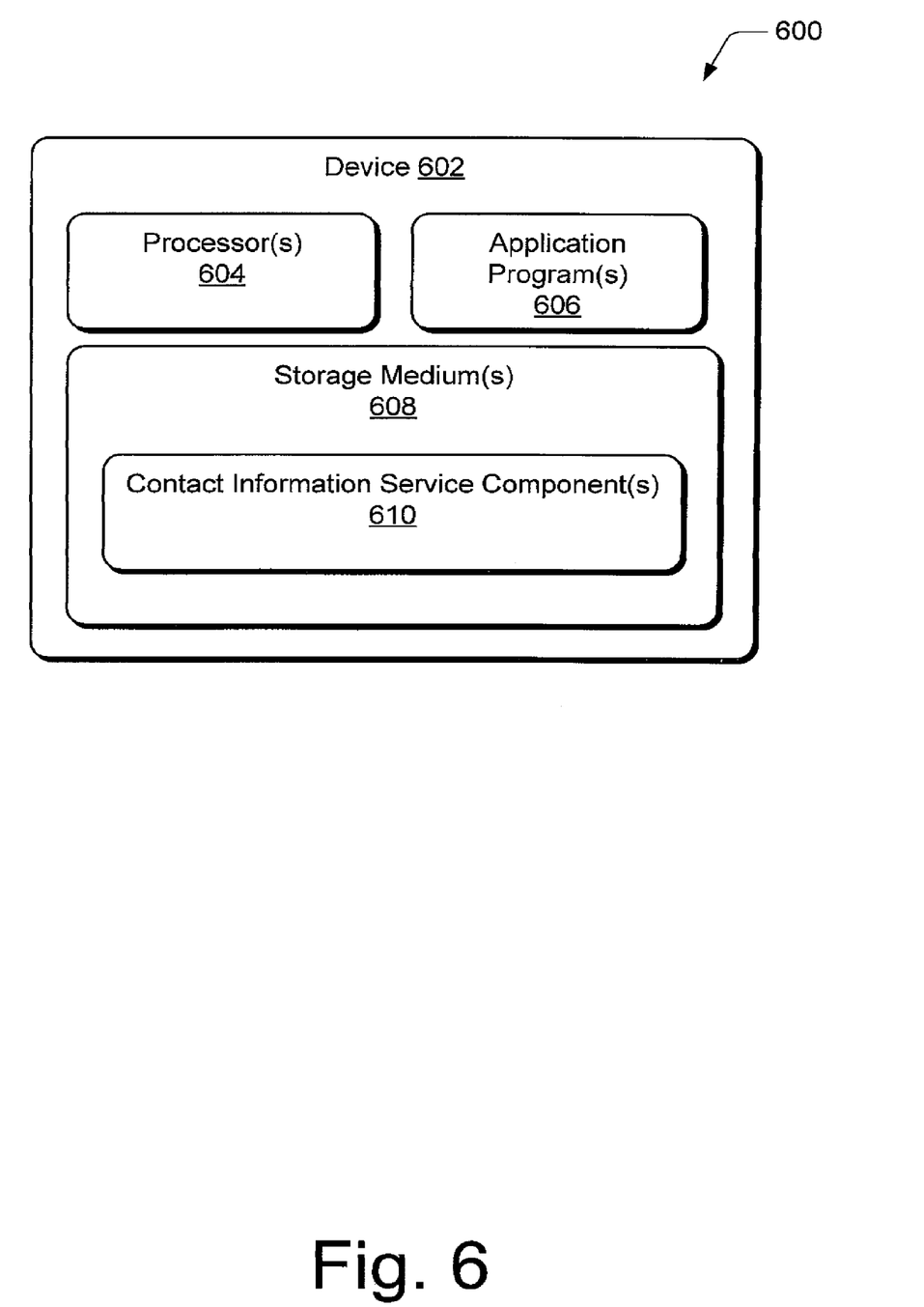
FIG. 6 is a block diagram illustrating an exemplary device in which embodiments of contact information management can be implemented.

FIG. 6 illustrates an exemplary device 602 in which embodiments of contact information management can be implemented. The device 602 may represent, for example, any device that performs any aspect of the preceding description. Such devices may include the devices 104 and 108 as shown in FIG. 1, or any device implementing, in whole or in part, the contact information services or communication networks as shown in FIGS. 1-3. As illustrated here, the components of exemplary device 602 can include, but are not limited to, one or more processors 604 (e.g., microprocessors, controllers, and the like), one or more application programs 606, and one or more computer-readable or machine-readable storage mediums 608. The one or more of the storage mediums 608 may contain one or more contact information service components 610. The components 610 may be implemented as one or more executed software modules that, when loaded into the processor 604 and executed, cause the device 602 to perform any of the functions described herein.

As described herein, the contact information service components 610 can reside on a designated computing system such as exemplary device 602, and/or it can be distributed across one or more computer systems and/or computing networks and/or devices.

Although embodiments of contact information management have been described in language specific to features and/or methods, it is to be understood that the subject of the appended claims is not necessarily limited to the specific features or methods described. Rather, the specific features and methods are disclosed as exemplary implementations of contact information management.

The invention claimed is:

1. A method comprising:
   receiving contact information from a subscriber whose regular communication service has been disrupted due to a disaster;
   establishing an account for the subscriber which associates one or more identifiers for identifying the subscriber with the contact information received from the subscriber;
   indexing the account in a database, such that the account can be identified based on one or more of the identifiers;
   receiving an inquiry from a searching person who is attempting to contact the subscriber, such that the inquiry includes one or more of the identifiers;
   identifying the account in the database based on one or more of the identifiers received as part of the inquiry;
   communicating the contact information from the account identified to the searching person so that the searching person can contact the subscriber;
   determining that the subscriber's regular communication service includes an email service which has been disrupted due to the disaster; and
   generating an auto-response email message which is communicated to any searching person who attempts to contact the subscriber using the email service.

2. A method as recited in claim 1, further comprising:
   receiving one or more screening questions and associated answers from the subscriber, such that the screening questions can be used to control access to the contact information;
   presenting a screening question to the searching person in response to the inquiry;
   receiving an answer to the screening question from the searching person;
   determining that the answer received from the searching person does not match the associated answer provided by the subscriber, and that the contact information from the account identified will not be communicated to the searching person.

3. A method as recited in claim 1, wherein the inquiry from the searching party is received via a website maintained for locating subscribers affected by the disaster, and wherein the searching party can send a message to the subscriber once the account associated with the subscriber has been identified.

4. A method as recited in claim 1, wherein communicating the contact information includes making the contact information available via a web-site.

5. A method as recited in claim 1, wherein the contact information includes a voice message recorded by the subscriber, and wherein communicating the contact information includes playing the voice message.

6. A method as recited in claim 1, further comprising:
   determining that the subscriber's regular communication service includes a telephone service which has been disrupted due to the disaster; and
   playing a recorded message to any searching person who attempts to contact the subscriber using the telephone service.

7. A method as recited in claim 1, wherein the identifiers associated with the subscriber include a name.

8. A method comprising:
   establishing an account for a subscriber which can be used to provide contact information for contacting the subscriber in the event that a disaster disrupts a regular communication service of the subscriber;
   indexing the account in a database by associating one or more identifiers for identifying the subscriber with the account, such that the account can be identified based on one or more of the identifiers;
   activating the account when the regular communication service of the subscriber has been disrupted by the disaster, so that the contact information can be provided to a searching person who is attempting to contact the subscriber; and
   wherein the account established for the subscriber is configured to automatically communicate the contact information to designated others in the event that the subscriber's regular communication service is disrupted due to the disaster.

9. A method as recited in claim 8, further comprising:
   receiving a communication from the subscriber to change the contact information; and
   changing the contact information as indicated by the subscriber.

10. A method as recited in claim 8, wherein the account is established for the subscriber before the disaster occurs.

11. A method as recited in claim 8, wherein the account is established for the subscriber after the disaster occurs.

12. A method as recited in claim 8, wherein the account is established for the subscriber based on information the subscriber provides via an interactive voice response system.

13. A method as recited in claim 8, wherein the account is established for the subscriber based on information the subscriber provides via a web-site.

14. A method as recited in claim 8, wherein the account is automatically established for the subscriber in the event that the subscriber's regular communication service is disrupted due to the disaster.

15. A method comprising:

receiving contact information from a subscriber whose regular communication service has been disrupted due to a disaster;

establishing an account for the subscriber which associates one or more identifiers for identifying the subscriber with the contact information received from the subscriber;

indexing the account in a database, such that the account can be identified based on one or more of the identifiers;

receiving an inquiry from a searching person who is attempting to contact the subscriber, such that the inquiry includes one or more of the identifiers;

identifying the account in the database based on one or more of the identifiers received as part of the inquiry;

communicating the contact information from the account identified to the searching person so that the searching person can contact the subscriber;

determining that the subscriber's regular communication service includes an email service which has been disrupted due to the disaster; and generating an auto-response email message which is communicated to any searching person who attempts to contact the subscriber using the email service.

16. A method as recited in claim 1 wherein the contact information includes a contact telephone number.

\* \* \* \* \*